(12) United States Patent
Warner

(10) Patent No.: US 6,962,093 B2
(45) Date of Patent: Nov. 8, 2005

(54) NOISE REDUCTION STRUCTURE FOR POWER TAKE-OFF UNIT GEAR ASSEMBLY

(75) Inventor: Russell K. Warner, Nesbit, MS (US)

(73) Assignee: Parker Hannifin Corporation, Cleveland, OH (US)

( * ) Notice: Subject to any disclaimer, the term of this patent is extended or adjusted under 35 U.S.C. 154(b) by 124 days.

(21) Appl. No.: 10/336,249

(22) Filed: Jan. 3, 2003

(65) Prior Publication Data

US 2003/0145666 A1 Aug. 7, 2003

Related U.S. Application Data

(60) Provisional application No. 60/345,814, filed on Jan. 3, 2002.

(51) Int. Cl.[7] .............................. F16K 31/02; E05F 3/16
(52) U.S. Cl. ........................... 74/11; 475/154; 475/157; 475/149; 74/575; 74/577 R; 192/12 BA; 192/12 D; 192/17 D; 188/166; 188/167
(58) Field of Search .......................... 74/11, 409, 411.5, 74/440; 192/12 BA, 12 D, 17 D; 188/166, 167

(56) References Cited

U.S. PATENT DOCUMENTS

| | | | |
|---|---|---|---|
| 3,251,544 A | | 5/1966 | Pilz et al. |
| 3,847,347 A | | 11/1974 | Smilgys |
| 4,063,466 A | | 12/1977 | Showalter |
| 4,236,448 A | | 12/1980 | Wieland |
| 4,365,146 A | | 12/1982 | Smilgys |
| 4,406,174 A | | 9/1983 | Szostak |
| 4,652,781 A | * | 3/1987 | Andrei-Alexandru et al. 310/83 |
| 4,669,327 A | | 6/1987 | Aratsu |
| 5,257,543 A | | 11/1993 | Fogelberg |
| 5,415,257 A | * | 5/1995 | Shimamura et al. .......... 192/15 |
| 5,437,205 A | * | 8/1995 | Tseng .......................... 74/359 |
| 5,662,542 A | * | 9/1997 | Birchmeier ................. 475/154 |
| 5,983,743 A | | 11/1999 | McGregor et al. |
| 6,742,640 B1 | * | 6/2004 | Grogg et al. ................. 192/35 |

FOREIGN PATENT DOCUMENTS

DE 33 37 852 4/1984

OTHER PUBLICATIONS

"Take A Bite Out Of Backlash", pp. 21–24, PT Design Magazine, Mar. 1999.

* cited by examiner

Primary Examiner—David Fenstermacher
Assistant Examiner—Patrick J. Tangney
(74) Attorney, Agent, or Firm—MacMillan, Sobanski & Todd, LLC

(57) ABSTRACT

A noise reduction structure is provided for use with a meshing gear assembly, such as in a power take-off unit for selectively providing power to one or more rotatably driven accessories. The meshing gear assembly includes meshing input and output gears that are supported within a housing and are rotatably driven during use. A helical coil wrap spring extends about and is frictionally engaged with a portion of the output gear. A first end of the wrap spring extends outwardly therefrom to form a control tang that extends adjacent to an abutment surface provided on the housing of the power take-off unit. As a result, the wrap spring is prevented from rotating relative to the housing as the output gear is rotatably driven. The wrap spring is wound and sized to frictionally engage the output gear and thereby impart a constant drag thereon as the output gear is rotated in a first rotational direction during use and to prevent the output gear from rotating in a second rotational direction opposite to the first rotational direction. As a result, the amount of noise that is generated when the power take-off unit is operated is significantly reduced.

8 Claims, 2 Drawing Sheets

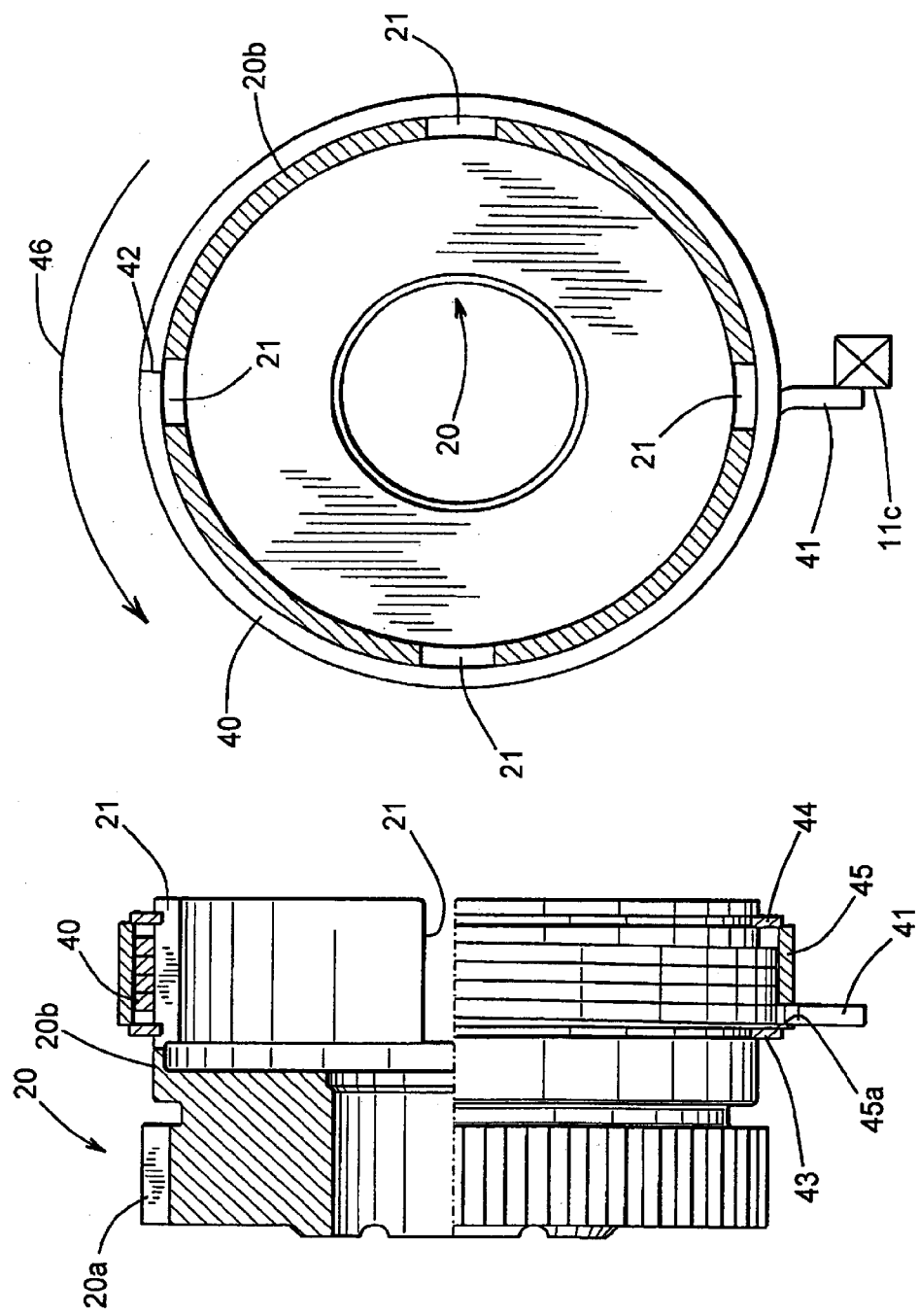

NOISE REDUCTION STRUCTURE FOR POWER TAKE-OFF UNIT GEAR ASSEMBLY

CROSS REFERENCE TO RELATED APPLICATION

This application claims the benefit of U.S. Provisional Application No. 60/345,814, filed Jan. 3, 2002, the disclosure of which is incorporated herein by reference.

BACKGROUND OF THE INVENTION

This invention relates in general to noise reduction structures for use with meshing gear assemblies. In particularly, this invention relates to an improved noise reduction structure for use with a meshing gear assembly in a power take-off unit.

Power take-off units are well known mechanical devices that are commonly used in conjunction with sources of rotational energy, such as vehicle engines and transmissions, for selectively providing power to one or more rotatably driven accessories. For example, power take-off units are commonly used in a variety of industrial and agricultural vehicles for operating hydraulic pumps that, in turn, operate hydraulically driven accessories, such as plows, trash compactors, lifting mechanisms, winches, and the like. The power take-off unit provides a relatively simple and inexpensive mechanism for supplying rotational power from the vehicle engine to operate the rotatably driven accessory.

To accomplish this, a typical power take-off unit includes a rigid housing having a mounting surface formed thereon. An opening is formed through a portion of the mounting surface of the power take-off housing. An input gear is rotatably supported within the housing and includes a portion that extends outwardly through the opening formed through the mounting surface. The mounting surface of the power take-off unit housing is adapted to be secured (typically by a plurality of bolts) to a corresponding mounting surface formed on a case of a transmission provided on the vehicle. An opening is also formed through a portion of the mounting surface of the transmission case. When the power take-off unit housing is secured to the transmission case, the input gear extends through the opening formed through the transmission case into meshing engagement with one of the transmission gears, typically a transmission gear that is driven by the vehicle engine. As a result, the input gear of the power take-off unit is rotatably driven whenever the vehicle engine is operated.

The power take-off unit typically further includes an output gear that is rotatably supported within the housing. The output gear meshes with the input gear such that the output gear is rotatably driven by the input gear whenever the vehicle engine is operated. The output gear is, in turn, connected to an output shaft that is rotatably supported within the power take-off housing. The output shaft extends outwardly from the housing of the power take-off unit and is adapted to be connected to the rotatably driven accessory. In some instances, the output gear is directly connected to the output shaft. In those instances, the output shaft is rotatably driven by the output gear whenever the vehicle engine is operated. In other instances, however, the output gear is connected through a clutch assembly to the output shaft. The clutch assembly is provided within the power take-off housing for selectively connecting the output gear to the output shaft and, therefore, permitting selective or intermittent operation of the rotatably driven accessory whenever the vehicle engine is operated.

When a typical power take-off unit is operated, it often generates an undesirable amount of noise. Such noise usually results from the combination of torsional vibrations that are generated from the vehicle engine to the power take-off unit and backlash or looseness that typically exists between the meshing gears contained within the power take-off unit. It has been found that such torsional vibrations can cause the loosely meshing gears to rattle against one another as they are rotatably driven during use. Although the generation of such noise does not usually adversely affect the operation of the power take-off unit, it can be quite bothersome to persons that are located in the vicinity. A variety of noise reduction structures for meshing gear assemblies are known in the art. However, such known noise reduction structures have been found to be deficient for various reasons. Thus, it would be desirable to provide an improved noise reduction structure for use with a meshing gear assembly in a power take-off unit.

SUMMARY OF THE INVENTION

This invention relates to an improved noise reduction structure for use with a meshing gear assembly, such as in a power take-off unit for selectively providing power to one or more rotatably driven accessories. The meshing gear assembly includes meshing input and output gears that are supported within a housing and are rotatably driven during use. A helical coil wrap spring extends about and is frictionally engaged with a portion of the output gear. A first end of the wrap spring extends outwardly therefrom to form a control tang that extends adjacent to an abutment surface provided on the housing of the power take-off unit. As a result, the wrap spring is prevented from rotating relative to the housing as the output gear is rotatably driven. The wrap spring is wound and sized to frictionally engage the output gear and thereby impart a constant drag thereon as the output gear is rotated in a first rotational direction during use and to prevent the output gear from rotating in a second rotational direction opposite to the first rotational direction. As a result, the amount of noise that is generated when the power take-off unit is operated is significantly reduced.

Various objects and advantages of this invention will become apparent to those skilled in the art from the following detailed description of the preferred embodiment, when read in light of the accompanying drawings.

BRIEF DESCRIPTION OF THE DRAWINGS

FIG. 2 is an enlarged sectional elevational view of the output gear of the power take-off unit and the noise reduction structure illustrated in FIG. 1.

FIG. 3 is a side elevational view of the output gear and the wrap spring of the noise reduction structure illustrated in FIG. 2.

DETAILED DESCRIPTION OF THE PREFERRED EMBODIMENT

Figure 1:
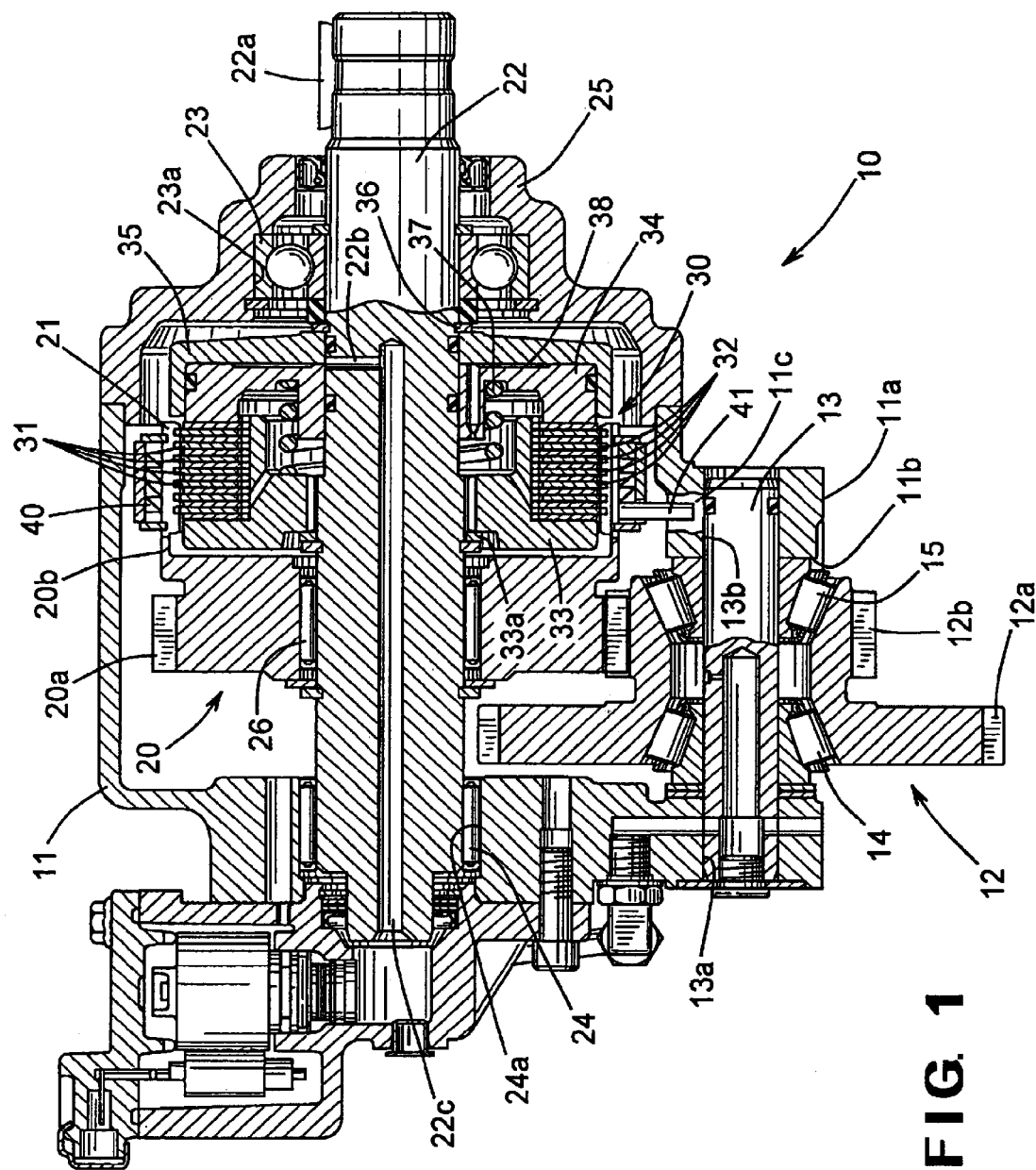
FIG. 1 is a sectional elevational view of a power take-off unit including a noise reduction structure in accordance with this invention.

Referring now to the drawings, there is illustrated in FIG. 1 a power take-off unit, indicated generally at 10, in accordance with this invention. The illustrated power take-off unit 10 is, in large measure, conventional in the art and is intended merely to illustrate one environment in which this invention may be used. Thus, the scope of this invention is not intended to be limited for use with the specific structure for the power take-off unit 10 illustrated in FIG. 1 or with power take-off units in general. On the contrary, as will become apparent below, this invention may be used in any desired environment for the purposes described below.

The illustrated power take-off unit 10 includes a rigid hollow housing 11 having a mounting surface 11a formed thereon. An opening 11b is formed through the mounting surface 11a for a purpose that will be described below. An input gear, indicated generally at 12, is rotatably supported in the housing 11 of the power takeoff unit 10. To accomplish this, an input shaft 13 is journaled in a pair of aligned openings 13a and 13b formed through the housing 11 of the power take-off unit 10. Thus, the input shaft 13 is stationary relative to the power take-off unit housing 11. The input gear 12 is rotatably supported on the input shaft 13 by a pair of bearings 14 and 15.

The input gear 12 has a first toothed gear portion 12a and a second toothed gear portion 12b formed thereon. The first toothed gear portion 12a is relatively large in diameter. As shown in FIG. 1, a portion of the first toothed gear portion 12a extends through the opening 11b formed through the mounting surface 11a of the power takeoff housing 11. Thus, when the power take-off unit 10 is mounted on a vehicle transmission (not shown) or other source of rotational power in the manner described above, the first toothed gear portion 12a of the input gear 12 extends through the opening 11b into meshing engagement with one of the transmission gears, typically a transmission gear that is rotatably driven whenever the vehicle engine is operated. As a result, the input gear 12 of the power take-of unit 10 is rotatably driven whenever the vehicle engine is operated.

The power take-off unit 10 further includes an output gear, indicated generally at 20, that is rotatably driven by the input gear 12. The structure of the output gear 20 is more clearly illustrated in FIG. 2. As shown therein, the output gear 20 includes a toothed gear portion 20a and a bell portion 20b. The toothed gear portion 20a of the output gear 20 meshes with the second toothed gear portion 12b of the input gear 12. Thus, the output gear 20 is rotatably driven by the input gear 12 whenever the vehicle engine is operated. The bell portion 20b of the output gear 20 is generally hollow and cylindrical in shape and extends axially from the toothed gear portion 20a. The bell portion 20b has a plurality of slots 21 formed therein for a purpose that will be explained below.

The output gear 20 is rotatably supported in the housing 11 of the power takeoff unit 10. To accomplish this, an output shaft 22 is rotatably supported in a pair of aligned bearings 23 and 24. The bearing 23 is journaled in a recess 23a formed in a bearing cap 25 secured to the housing 11 of the power take-off unit 10. The bearing 24 is journaled in a recess 24a formed in the interior of the housing 11 of the power take-off unit 10. Thus, the output shaft 22 is rotatably supported in the housing 11 of the power take-off unit 10. The output gear 20 is rotatably supported on the output shaft 22 by a bearing 26. The end of the output shaft 22 rotatably supported by the bearing 23 has a key 22a, an internal spline (not shown), or other similar structure formed therein to facilitate the connection of the output shaft 22 to a rotatably driven accessory (not shown).

The power take-off unit 10 also includes a clutch assembly, indicated generally at 30, for selectively providing a driving connection between the bell portion 20b of the output gear 20 and the output shaft 22. The clutch assembly 30 includes a first plurality of flat, annular clutch plates 31 that are connected to the bell portion 20b of the output gear 20 for rotation therewith. To accomplish this, each of the first plurality of clutch plates 31 has one or more radially outwardly extending protrusions formed thereon. The protrusions of the clutch plates 31 are received in the slots 21 formed in the bell portion 20b of the output gear 20 for rotation therewith. Thus, the first plurality of clutch plates 31 are rotatably driven by the output gear 20 whenever the vehicle engine is operated. The clutch assembly 30 further includes a second plurality of flat, annular clutch plates 32. The second plurality of clutch plates 32 is disposed in alternating fashion between the first plurality of clutch plates 31. The second plurality of clutch plates 32 are splined to a clutch gear 33 that, in turn, is splined onto the output shaft 22. Thus, the second plurality of clutch plates 32, the clutch gear 33, and the output shaft 22 are connected for rotation together as a unit. The clutch gear 33 is restrained from axial movement in one direction (toward the left when viewing FIG. 1) by one or more retaining rings 33a that are received within a groove formed in the outer surface of the output shaft 22.

The clutch assembly 30 further includes an annular clutch piston 34 that is disposed within a hollow cylindrical clutch cylinder 35. The clutch cylinder 35 has a closed end and an opened end. One end of the clutch piston 34 (the right end when viewing FIG. 1) is disposed within the clutch cylinder 35, while the opposite end of the clutch piston 34 (the left end when viewing FIG. 1) extends from the opened end of the clutch cylinder 35 adjacent to the first and second pluralities of clutch plates 31 and 32. Both the clutch piston 34 and the clutch cylinder 35 are supported on the output shaft 22. The clutch piston 34 is axially movable along the output shaft 34, but the clutch cylinder 35 is restrained from axial movement in one direction (toward the right when viewing FIG. 1) by one or more retaining rings 36 mounted on the output shaft 22. A coiled clutch spring 37 reacts between the clutch piston 34 and the clutch gear 33. As discussed above, the clutch gear 33 is restrained from axial movement in one direction (toward the left when viewing FIG. 1) by the retaining rings 33a. Thus, the clutch spring 37 urges the clutch piston 34 axially in the opposite direction (toward the right when viewing FIG. 1) toward a disengaged position adjacent to the closed end of the clutch cylinder 35. In the disengaged position, the clutch piston 34 does not engage the first and second pluralities of clutch plates 31 and 32. Thus, the clutch plates 31 and 32 do not frictionally engage one another. As a result, the clutch gear 33 is disconnected from the output gear 20 so as to provide no rotatable driving connection therebetween. In this condition, the output shaft 22 is not rotatably driven by the output gear 20.

An annular clutch chamber 38 is defined between the clutch piston 34 and the closed end of the clutch cylinder 35. This annular clutch chamber 38 communicates through a transverse passageway 22b and an axial passageway 22c formed through the output shaft 22 with a source of pressurized fluid (not shown). As is well known, when pressurized fluid is provided from the source to the annular clutch chamber 38, the clutch piston 34 is moved axially against the urging of the clutch spring 37 from the disengaged position to an engaged position (toward the left when viewing FIG. 1). In the engaged position, the clutch piston 34 compresses the first and second pluralities of clutch plates 31 and 32 together into frictional engagement. As a result, the clutch gear 33 is connected to the output gear 20 so as to provide a rotatable driving connection therebetween. In this condition, the output shaft 22 is rotatably driven by the output gear 20.

As mentioned above, when a typical power take-off unit is operated, it often generates an undesirable amount of noise. Such noise usually results from the combination of torsional vibrations that are generated from the vehicle engine to the power take-off unit and backlash or looseness that typically exists between the meshing gears, such as the input gear 12 and the output gear 20 contained within the power take-off unit 10. It has been found that such torsional vibrations can cause the loosely meshing gears to rattle against one another as they are rotatably driven during use.

To reduce or eliminate this from occurring, a wrap spring 40 is disposed about a portion of the output gear 20. The structure of the wrap spring 40 is best shown in FIGS. 2 and 3. As shown therein, the illustrated wrap spring 40 is a helical coil spring that extends about and is engaged with the outer surface of the bell portion 20*b* of the output gear 20. If desired, the wrap spring 40 may have a plurality of helical coils. Regardless, the wrap spring 40 is preferably formed from a metallic wire material having a generally square cross sectional shape, although such is not required. A first end of the wrap spring 40 extends outwardly therefrom to form a control tang 41. The purpose for the control tang 41 will be explained below. A second end 42 (see FIG. 3) of the wrap spring 40 does not extend outwardly therefrom. The wrap spring 40 is retained on the outer surface of the bell portion 20*b* of the output gear 20 by a pair of retaining rings 43 and 44. Additionally, a hollow cylindrical collar 45 can extend circumferentially about the wrap spring 40 between the retaining rings 43 and 44. The collar 45 has an opening 45*a* through which the tang 41 of the wrap spring 40 can extend.

During normal operation of the power take-off unit 10, rotation of the input gear 12 causes the output gear 20 to be rotated in a first rotational direction, which is indicated by the arrow 46 illustrated in FIG. 3. The wrap spring 40 is sized to frictionally engage the outer surface of the bell portion 20*b* of the output gear 20. Thus, absent the control tang 41, the wrap spring 40 would normally rotate in the first rotational direction with the output gear 20. However, the wrap spring 40 is prevented from rotating relative to the housing 11 by the control tang 41, which extends outwardly therefrom, as discussed above. The control tang 41 of the wrap spring 40 extends adjacent to a stationary abutment surface 11*c* that can, for example, be provided on the housing 11 of the power take-off unit 10. The abutment surface 11*c* may, for example, be embodied as a slot formed in the housing 11. The engagement of the control tang 41 with the abutment surface 11*c* prevents the wrap spring 40 from rotating relative to the housing 11.

The wrap spring 40 is wrapped about the output gear 20 in a helical direction that causes the wrap spring to be unwound when the output gear 20 is rotated in the first rotational direction 46. Nonetheless, however, the wrap spring 40 remains in frictional engagement with the bell portion 20*b* of the output gear 20. This frictional engagement tends to resist, but does not prevent, the rotation of the output gear 20 in the first rotational direction during operation. The magnitude of this frictional rotational drag is large enough to reduce or eliminate a portion of the backlash between the input gear 12 and the output gear 20, but is small enough to not significantly diminish the overall operating efficiency of the power take-off unit 10 during normal operation. The hollow cylindrical collar 45 is provided to positively retain the wrap spring 40 about the bell portion 20*b* of the output gear 20 when it is unwound as a result of the rotation of the output gear 20 in the first rotational direction 46.

The wrap spring 40 is also effective to prevent rotation of the output gear 20 in a second rotational direction that is opposite to the first rotational direction 46. The wrap spring 40 is wrapped about the output gear 20 in a helical direction that causes the wrap spring to be wound when the output gear 20 is rotated in the second rotational direction. Thus, any tendency of the output gear 20 to rotate in the second direction, which might be caused by the above-mentioned torsional vibrations encountered during operation, is effectively prevent by the wrap spring 40. Consequently, the amount of noise that is generated when the power take-off unit 10 is operated is significantly reduced.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A power take-off unit comprising:

a hollow housing;

an input gear supported within said housing and adapted to be rotatably driven by a source of rotational energy, said input gear having a plurality of input gear teeth provided thereon;

an output gear adapted to be connected to a driven accessory and having a plurality of output gear teeth provided thereon, said plurality of output gear teeth meshing with said plurality of input gear teeth such that when said input gear is rotated, said output gear is rotated in a first rotational direction; and a wrap spring engaged with said output gear, said wrap spring allowing rotation of said output gear in the first rotational direction and preventing said output gear from rotating in the second rotational direction.

2. The power take-off unit defined in claim 1 wherein said wrap spring is a helical coil spring.

3. The power take-off unit defined in claim 1 wherein said wrap spring imparts a drag on said output gear when said output gear is rotated in the first rotational direction.

4. The power take-off unit defined in claim 1 wherein said wrap spring is sized to frictionally engage a portion of said output gear.

5. The power take-off unit defined in claim 1 wherein said wrap spring includes a control tang that engages a stationary abutment surface provided on said housing.

6. The power take-off unit defined in claim 1 wherein said output gear includes a toothed gear portion and a bell portion, and wherein said wrap spring is disposed about said bell portion of said output gear.

7. The power take-off unit defined in claim 1 wherein said wrap spring is restrained from axial movement relative to said output gear by a pair of retaining rings.

8. The power take-off unit defined in claim 1 further including a collar disposed about said wrap spring.

\* \* \* \* \*